United States Patent [19]

Minner

[11] 3,916,356

[45] Oct. 28, 1975

[54] CIRCUIT ARRANGEMENT FOR PROGRAM SELECTION

[75] Inventor: Willy Minner, Schwaigern, Germany

[73] Assignee: Licentia Patent-Verwaltungs-G.m.b.H., Frankfurt am Main, Germany

[22] Filed: Oct. 4, 1974

[21] Appl. No.: 512,322

[30] Foreign Application Priority Data

Oct. 5, 1973 Germany ........................... 2350060

[52] U.S. Cl. .................... 334/39; 325/464; 334/11; 334/89

[51] Int. Cl.[2] ............................................ H03J 5/14

[58] Field of Search .......................... 334/11, 14–15, 334/89, 39; 325/417, 457, 464; 331/49; 307/80–81, 223

[56] References Cited

UNITED STATES PATENTS

| | | | |
|---|---|---|---|
| 3,345,569 | 10/1967 | Casterline et al. | 331/49 |
| 3,720,876 | 3/1973 | Montgomery | 325/464 |
| 3,740,651 | 6/1973 | Mons | 334/15 |

*Primary Examiner*—Alfred E. Smith
*Assistant Examiner*—Wm. H. Punter
*Attorney, Agent, or Firm*—Spencer & Kaye

[57] ABSTRACT

A circuit arrangement for program selection comprises a sensor operated integrated circuit having a plurality of non preferential sensor circuits, the sensor circuits being connected to a program voltage source through an R.C. circuit and the sensor circuit to be made preferential has a further resistance connected between its R.C. circuit and the voltage source and a capacitor connected between the R.C. circuit side of the further resistance and earth.

3 Claims, 2 Drawing Figures

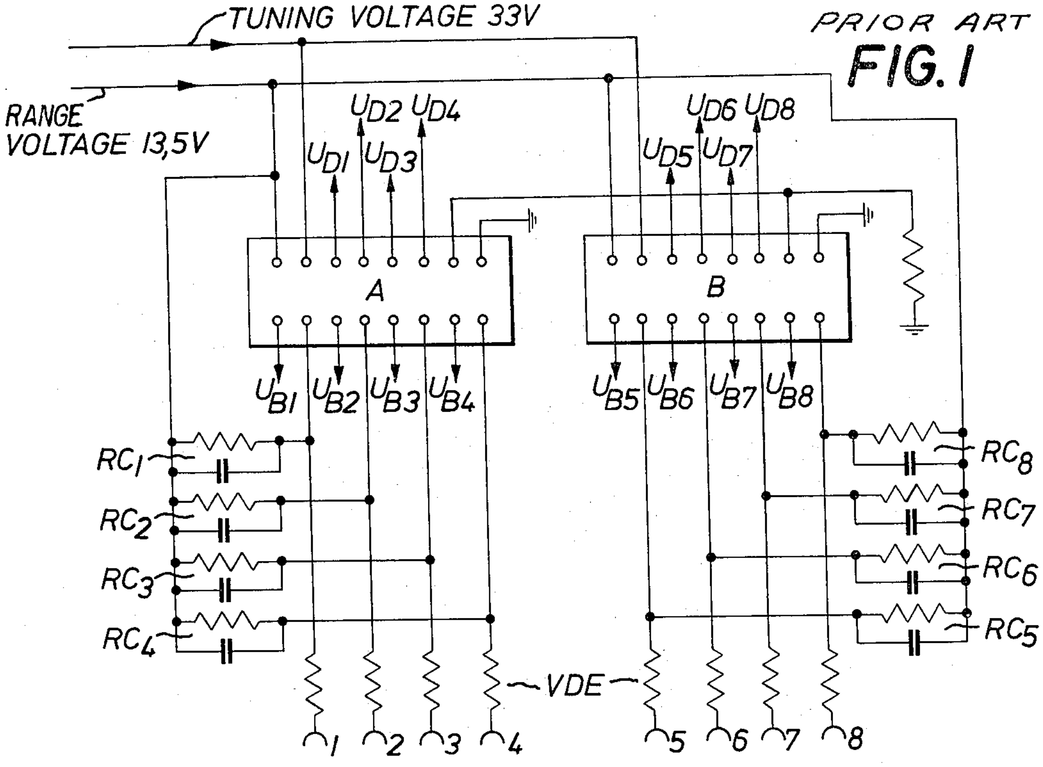
PRIOR ART FIG. 1
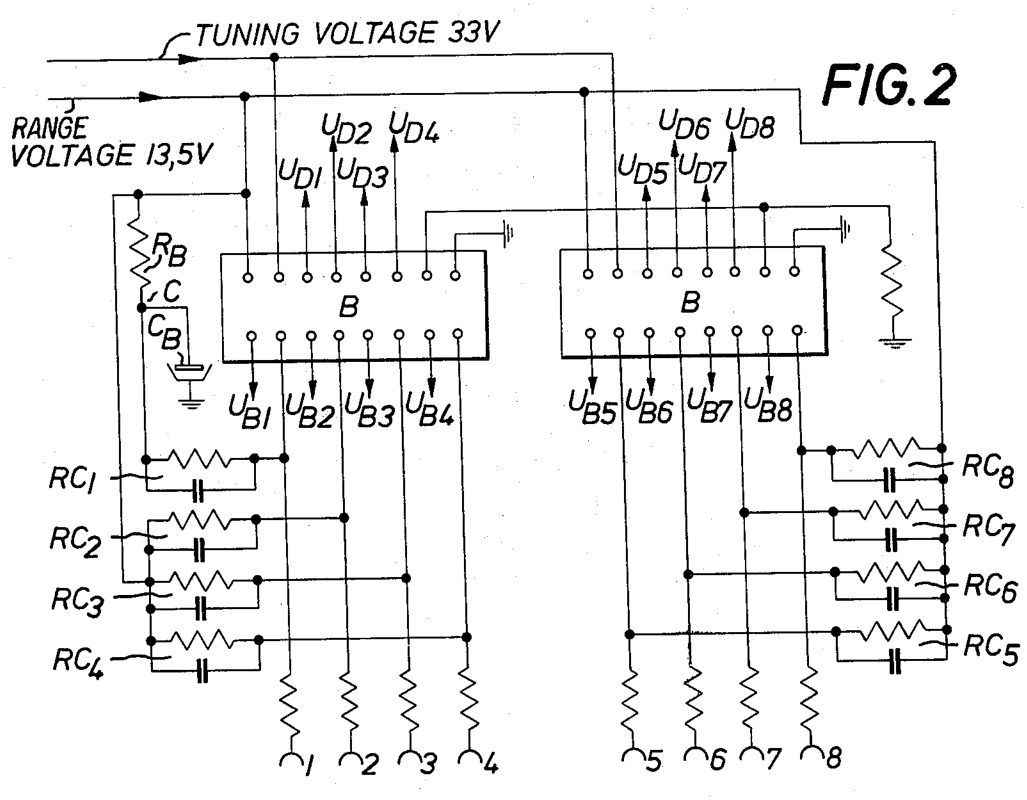
FIG. 2

CIRCUIT ARRANGEMENT FOR PROGRAM SELECTION

BACKGROUND OF THE INVENTION

The invention relates to a circuit arrangement for an electronic program selection, particularly for television and radio receivers, with sensors and integrated sensor circuits, in which the individual sensors are in each case connected to a range voltage by means of R.C. elements.

So-called sensor IC's are used for the electronic program selection for television and radio receivers. A sensor IC is an integrated circuit. In the electronic program selection it is required that on switching the equipment on again, a certain program appears. Therefore this program stage is equipped with a preferential circuit which is integrated in the integrated circuit and which guarantees a certain program after switching the equipment on again.

In television equipment it is usual to switch electronically eight programs. In this case two operational voltages must be connected in for each program through the integrated circuit, namely the tuning voltage $U_D$ for the frequency and the range voltage $U_B$ for band I, III or UHF. In the integrated circuits customary on the market for this purpose, which are accommodated in 16-terminal housings, only four program stages can be accommodated in one housing so that one intergrated circuit must be designed with a preferential circuit, whereas the other integrated circuit does not have a preferential circuit. Therefore two different types of integrated circuits are necessary for the electronic selection of eight programs.

Furthermore there is made of the electronic program selection the requirement that on switching on independently of the time, with which the tuning voltage and the range voltage are built up, always the program equipped with the preferential circuit switches on. In this case in practice difficulties occur frequently, because the build-up of the two voltages in the television equipment does not take place steadily but often has wild jumps with the not infrequent consequence that the program jumps over from the preferential to another program. Therefore often additional filtering and interlock measures must be applied, which guarantee that the said two voltages at the connections of the integrated circuits are steadily built up.

In a known circuit which comprises the two integrated circuits, the first circuit differs from the circuit in that it has a preferential circuit which is integrated. A tuning voltage of 33V and an operating voltage of 13.5V are fed to both circuits. The connected voltages belonging to the program can be removed from the outputs of the circuits if the corresponding sensor is connected to earth. The sensors are connected to the inputs of the sensor IC's by means of VDE resistances and the inputs of the sensor IC's are each connected to the range voltage (+13.5V) by means of a RC element. The RC elements make sure that the non-touched sensor inputs are held safely at plus potential and do not switch in unintendedly or through leakage currents. When putting the equipment into operation, the preferential circuit integrated in the first integrated circuit is to make sure that the preferred program is switched in and remains until another sensor is touched.

SUMMARY OF THE INVENTION

It is an object of the invention to improve the known circuit with regard to the susceptibility to disturbance on build-up of both voltages in the television equipment and to provide a circuit in which the equipment producer can determine by corresponding selection of external components, which are not integrated in the integrated circuits, which of the programs should be the preferential one.

According to a first aspect of the invention, there is provided a circuit arrangement for an electronic program selection comprising a plurality of sensors, an integrated circuit component having a plurality of non-preferential sensor circuits each connected to a said sensor, a plurality of R.C. elements each connected to a said sensor, a program voltage source to which said R.C. elements are connected, a further resistance connected between the R.C. element of a sensor to be made preferential and said program voltage source and a capacitance connected at one side between said further resistance and said R.C. element of said sensor to be made preferential and connected at the other side to earth.

According to a second aspect of the invention, there is provided a circuit arrangement for an electronic program selection, particularly for television and radio receivers, with sensors and, more generally, integrated sensor circuits, in which the individual sensors are connected in each case by means of R.C. elements to one terminal of the range voltage source, characterised in that the integrated sensor circuit does not have any preferential circuit, in that that sensor which actuates the preferential program is not connected directly through the R.C. element to the one terminal of the range voltage source but by means of a resistance which is connected between one terminal of the range voltage source and the R.C. element and in that at the end facing the R.C. element of this resistance, a capacitance is connected to earth.

BRIEF DESCRIPTION OF THE DRAWINGS

The invention will now be described in greater detail, by way of example, with reference to the drawings, in which:

FIG. 1 is a schematic circuit diagram of a known circuit arrangement, and

FIG. 2 is a circuit diagram similar to FIG. 1, but incorporating an embodiment of the invention.

DESCRIPTION OF THE PREFERRED EMBODIMENTS

For ease in understanding the invention, a known circuit will first be described with reference to FIG. 1.

FIG. 1 shows a known circuit which comprises two integrated circuits A and B. The circuit A differs from the circuit B in that, as compared to B, it has a preferential circuit which is integrated. A tuning voltage of 33V and an operating, or range, voltage of 13.5V are fed to both circuits. The connected voltages $U_{D1}$ and $U_{B1}$ (to $U_{D8}$ and $U_{B8}$) associated with the program can be taken from the outputs of the circuits if the corresponding sensor 1 to 8 is connected to earth. The sensors 1 to 8 are connected to the inputs of the sensor IC's by means of VDE resistances and the inputs of the sensor IC's are each connected to the range voltage (+13.5V) by means of a R.C. element ($RC_1$ to $RC_8$).

The R.C. elements make sure that the non-touched sensor inputs are held safely at plus potential and do not switch in unintendedly or through leakage currents. When putting the equipment into operation, the preferential circuit integrated in the circuit A is to make sure that the preferred program 1, thus $U_{D1}$ and $U_{B1}$ of the original, is switched in and remains until another sensor is touched.

Basically the invention proposes, in a circuit arrangement of the type shown in FIG. 1, that the integrated sensor circuits do not have any preferential circuit, in that that sensor which actuates the preferential program is not directly connected via the R.C. element to the one terminal of the range voltage source, but via a resistance ($R_B$) which is connected between one terminal of the range voltage source and the R.C. element and in that at the end of this resistance ($R_B$) facing the R.C. element, a capacitance ($C_B$) is connected to earth.

In a circuit arrangement in accordance with the invention then, a co-integrated or above all integrated preferential circuit is dispensed with, but it is ensured by two external circuit elements that the preferential program remains switched in for a time period built in by the dimensioning of these circuit elements, which time can be longer than the time which is necessary for the complete build-up of the said two voltages after switching on the equipment. All other seven programs are interlocked or locked during this time and cannot be switched in. Since it is a question, in the case of the preferential circuit, of two external circuit elements, the equipment producer can determine which program is the preferential one and is not referred to a program specified by the integrated circuit.

The time constants of the R.C. element representing the preferential circuit, which element comprising the resistance ($R_B$) connected in front of the range voltage in the preferential circuit and the capacitance ($C_B$) connected between the one end of this resistance and earth is selected in such a way that the other sensors make possible a switch over to another program only if the other voltages present in the equipment are completely built up.

FIG. 2 shows a circuit arrangement according to the invention. The two integrated circuits B are both without an integrated preferential circuit. As compared to the arrangement of FIG. 1 the R.C. element $RC_1$ is not directly connected to the range potential of 13.5V, but by means of the resistance $R_B$ at point C of which a capacitance $C_B$ is connected to earth. The resistance $R_B$ and the capacitance $C_B$ form the external preferential circuit.

As long as the equipment is switched off, no voltage and thus earth potential is applied to the capacitance $C_B$. If the equipment is switched on, then the voltage at the capacitance $C_B$ climbs with the time constant $R_B.C_B$ and distributes this voltage by means of $RC_1$ to the sensor IC input 1. This latter input is thus, after switching on the equipment, more negative than all the other sensor IC inputs and therefore switches program 1 on. Only if the voltage at the point C of the capacitance is approximately equal to the range voltage can other programs be connected by the sensors. In practice the time *t*, which must elapse, and during which other programs cannot be switched on, amounts to approximately $4.R_B.C_B$. Since this time can be selected to be longer than the time for build-up of the operational voltages in the equipment, it is ensured that the program thus made preferential does not jump over in an unintended manner to any other.

If the R.C. combination $RC_1$ is not applied to the point B but to another of the R.C. combinations, such as e.g. the combination $RC_4$, another program is preferential; in the case of $RC_4$, for example, the fourth program.

It will be understood that the present invention is suceptible to various modification changes and adaptations.

What is claimed is:

1. A circuit arrangement for an electronic program selection, particularly for television and radio receivers, with sensors and integrated sensor circuits, in which the individual sensors are connected in each case by means of R.C. elements to one terminal of a range voltage source, characterised in that the integrated sensor circuits do not have any preferential circuit, in that that sensor which actuates the preferential program is not connected directly through the R.C. element to the one terminal of the range voltage source but by means of a resistance which is connected between one terminal of the range voltage source and the R.C. element and in that at the end of this resistance facing the R.C. element, a capacitance is connected to earth.

2. A circuit arrangement as defined in claim 1, wherein the time constant of the R.C. element, comprising the resistance and the capacitance is so selected that the other sensors make a switch over to another program possible only if the other voltages present in the equipment are completely built up.

3. A circuit arrangement for an electronic program selection comprising a plurality of sensors, an integrated circuit component having a plurality of non-preferential sensor circuits each connected to a said sensor, a plurality of R.C. elements each connected to a said sensor, a range voltage source to which said R.C. elements are connected, a further resistance connected between the R.C. element of a sensor to be made preferential and said range voltage source and a capacitance connected at one side between said further resistance and said R.C. element of said sensor to be made preferential and connected at the other side to earth.

* * * * *